United States Patent
Tsuzuki

(10) Patent No.: US 7,199,945 B2
(45) Date of Patent: Apr. 3, 2007

(54) LENS APPARATUS AND OPTICAL APPARATUS EQUIPPED WITH SAME

(75) Inventor: Masahiko Tsuzuki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/122,526

(22) Filed: May 4, 2005

(65) Prior Publication Data

US 2005/0254145 A1 Nov. 17, 2005

(30) Foreign Application Priority Data

May 11, 2004 (JP) ............................. 2004-140949

(51) Int. Cl.
*G02B 15/14* (2006.01)
(52) U.S. Cl. ...................... 359/701; 399/699; 399/819; 399/821; 399/822
(58) Field of Classification Search ................ 359/701, 359/699, 694, 695, 819, 821, 822, 823, 824
See application file for complete search history.

(56) References Cited

U.S. PATENT DOCUMENTS 5,860,030 A 1/1999 Tada et al.
6,606,206 B2 8/2003 Takeshita et al.
2004/0125225 A1* 7/2004 Noguchi ..................... 348/335

FOREIGN PATENT DOCUMENTS

| JP | 08-095142 | 4/1996 |
| JP | 08-248291 | 10/1996 |
| JP | 10-197775 | 7/1998 |
| JP | 2001-324663 | 11/2001 |
| JP | 2003-131111 | 5/2003 |

* cited by examiner

*Primary Examiner*—Timothy Thompson
(74) *Attorney, Agent, or Firm*—Morgan & Finnegan, LLP

(57) ABSTRACT

The present invention provides a lens apparatus including a fixed lens barrel, a cam ring that is rotatable relative to the fixed lens barrel, a first lens holding frame adapted to move, upon rotation of the cam ring, relative to the fixed lens barrel along the optical axis direction over the range from a collapsed position in which image taking is not allowed to an extended position in which image taking is allowed, a second lens holding frame disposed on the image side of the first lens holding frame, and a linear driving portion disposed outside the cam ring, for driving the second lens holding frame along the optical axis direction using a coil and a magnet. The length of the lens apparatus is relatively short and it is advantageous in portability.

9 Claims, 5 Drawing Sheets

LENS APPARATUS AND OPTICAL APPARATUS EQUIPPED WITH SAME

BACKGROUND OF THE INVENTION

1. Field of the Invention

The present invention relates to a lens apparatus (or a lens barrel) and an optical apparatus equipped with the same, which are suitably applied to optical apparatuses such as still cameras, digital still cameras and video cameras.

2. Related Background Art

Various lens barrels of the collapsible type have been conventionally proposed. In the collapsible type lens barrel, a lens barrel member such as a lens holding frame that holds a lens(es) is moved toward the camera body to reduce its length along the optical axis to thereby improve portability.

Japanese Patent Application Laid-Open No. 2001-324663 discloses a mechanism, used in a lens barrel of the collapsible type, that drives a focusing lens (the third lens unit) along the optical axis direction while effecting position control. This mechanism is adapted to drive the focusing lens by rotating an output screw portion of a stepping motor mounted on a base member on which an image pickup element is held while regulating the position of a lens barrel member that fixedly holds the focusing lens along the optical axis by engagement of the output screw portion of the stepping motor and a nut portion provided on the lens barrel member for the focusing lens.

In addition, the initial position of the lens barrel member for the third lens unit is determined by passing of a projection formed on the lens barrel member through a photosensor, and position control along the optical axis is effected by driving the rotation of the stepping motor from the initial position using pulses.

In the lens apparatus disclosed in Japanese Patent Application Laid-Open No. 2001-324663, the output screw portion of the stepping motor for driving the lens barrel member for the third lens unit and the nut portion provided on the lens barrel member are disposed inside a cam ring. Accordingly, there is a risk that these portions can interfere with the lens barrel member of the magnification changing lens (or the first and second lens units) driven along the optical axis by the cam ring, and therefore it is difficult to reduce the total length of the lens in the collapsed state.

According to one method of preventing the interfere, an opening is formed on the lens barrel member for the magnification changing lens to prevent its interference with the output screw portion of the stepping motor. However, this method sometimes invites entrance of undesirable light onto the image pickup element through the opening.

Japanese Patent Application Laid-Open No. 2003-131111 also discloses a lens driving mechanism. In this mechanism, in the collapsed state in which image taking is not allowed, the first and second lens units are moved backward along the optical axis so as to be kept in the collapsed position.

In this collapsible lens barrel, a drive source for focusing composed of a stepping motor for driving the third lens unit is provided outside the first lens unit and the second lens unit.

In the lens apparatus disclosed in Japanese Patent Application Laid-Open No. 2003-131111, the sum of the length of the stepping motor and the length of the output screw portion is significantly long as compared to the move amount of the lens units along the optical axis. Accordingly, it is difficult to make the length of the lens barrel short, and it is disadvantageous in terms of portability.

Furthermore, in the case that driving of focusing lens is controlled by an operation of the stepping motor with pulses as is the case with the above-mentioned patent documents, it is difficult to achieve fine movement and high speed, since the movement pitch of the focusing lens is determined by the pitch of the screw of the stepping motor.

SUMMARY OF THE INVENTION

In view of the above circumstances, an object of the present invention is to achieve a reduction in the total length of a lens in its collapsed state to provide a lens apparatus with excellent portability and an optical apparatus equipped with such a lens apparatus.

To achieve the above object, according to one aspect of the present invention, there is provided a lens apparatus including a fixed lens barrel, a cam ring that is rotatable relative to the fixed lens barrel, a first lens holding frame adapted to move, upon rotation of the cam ring, relative to the fixed lens barrel along the optical axis direction over the range from a collapsed position in which image taking is not allowed to an extended position in which image taking is allowed, a second lens holding frame disposed on the image side of the first lens holding frame, and a driving portion having a coil and a magnet, disposed outside the cam ring, for driving the second lens holding frame along the optical axis direction.

Other features and advantages of the present invention will be apparent from the following description taken in conjunction with the accompanying drawings, throughout which like reference characters designate the same or similar parts.

BRIEF DESCRIPTION OF THE DRAWINGS

The accompanying drawings, which are incorporated in and constitute a part of the specification, illustrate an embodiment of the present invention and, together with the description, serve to explain the principles of the invention.

FIG. 5 is a flow chart of a control process when the power of the optical apparatus according to the present invention is turned on.

DETAILED DESCRIPTION OF THE PREFERRED EMBODIMENTS

Figure 1:
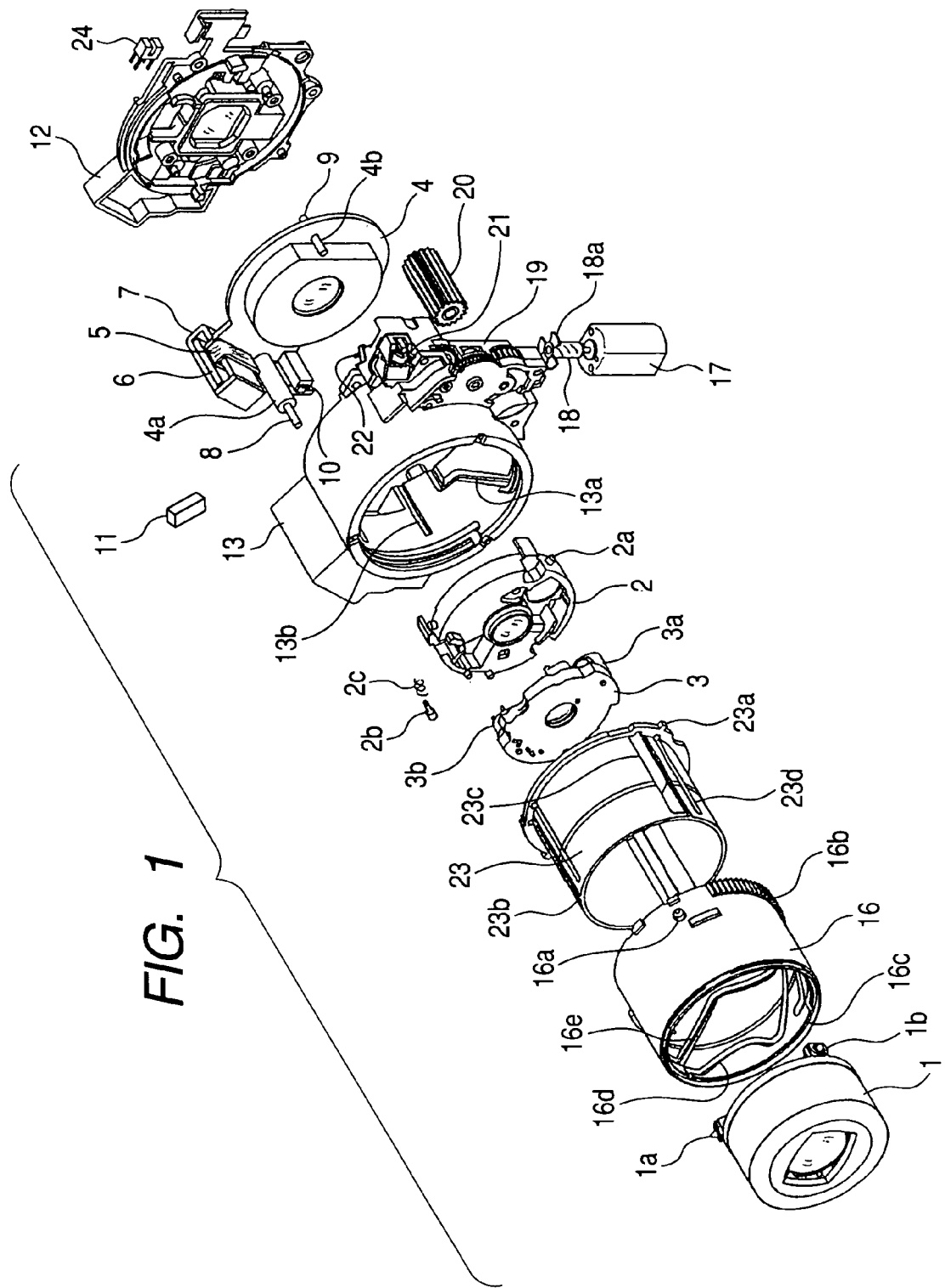
FIG. 1 is an exploded perspective view showing a lens barrel according to the present invention.
Figure 2:
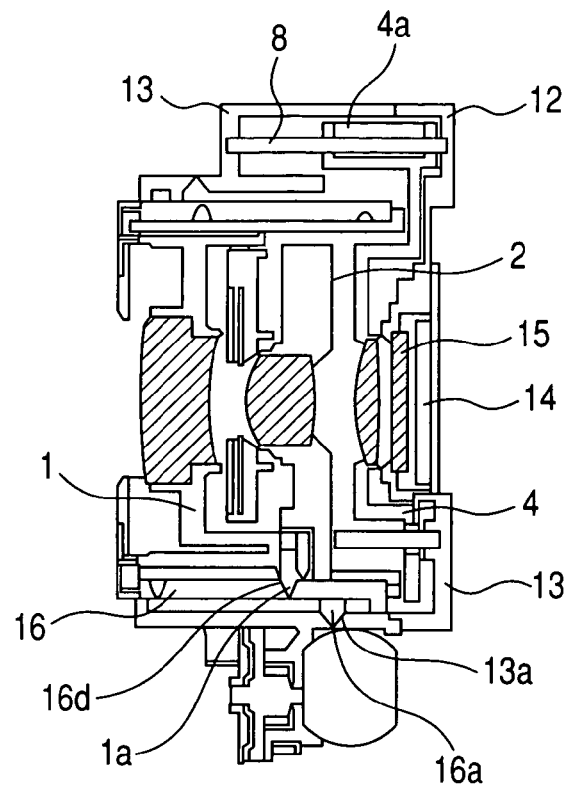
FIG. 2 is a cross sectional view showing the lens barrel according to the present invention in its collapsed state.
Figure 3:
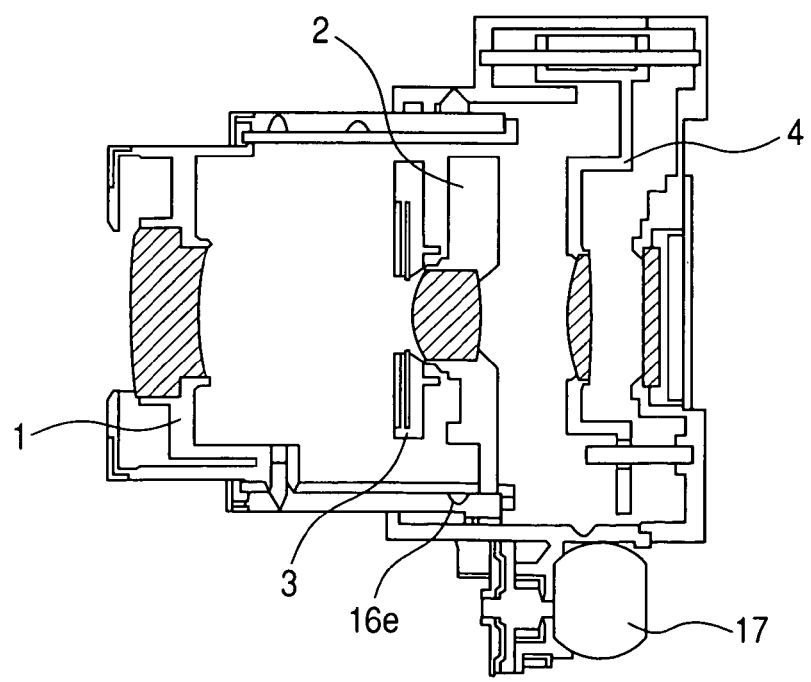
FIG. 3 is a cross sectional view showing the lens barrel according to the present invention in the state in which image taking is allowed.

FIG. 1 is a perspective view showing a lens barrel according to an embodiment of the present invention. FIGS. 2 and 3 are cross sectional views of the lens barrel of this embodiment. FIG. 2 shows the collapsed state in which image taking is not allowed, and FIG. 3 shows the extended state in which image taking is allowed.

The lens barrel (lens apparatus) of this embodiment is a zoom lens barrel in which a zoom optical system including three lens units are held.

The zoom optical system of this embodiment is a three-unit zoom optical system of a rear focus type composed of a lens unit having a negative refractive power, a lens unit having a positive refractive power and a lens unit having a positive refractive power arranged in the mentioned order from the object side to the image side, wherein zooming is effected by means of the first lens unit and the second lens unit, while focusing is effected by means of the third lens unit.

In FIGS. 1 to 3, reference numeral 1 designates a holding frame (the first lens holding frame) that holds the first lens unit. On the outer circumferential surface of the holding frame 1, three follower pins 1a are fixedly attached by press fitting. Each of the follower pins 1a has a tapered portion at its tip end.

Reference numeral 2 designates a movable holding frame (the third lens holding frame) that holds the second lens unit. The holding frame 2 has two followers 2a integrally formed on its outer circumferential surface. Each of the followers 2a has a tapered portion. In addition, a movable follower 2b that can move toward the optical axis center of the zoom optical system is also provided on the holding frame 2.

These three followers 2a, 2b are disposed at regular intervals on the outer circumference of the holding frame 2.

The movable follower 2b is biased by a compression spring 2c. Thus, precision in a mechanical interval is maintained by the biasing.

Reference numeral 3 designates a diaphragm unit fixedly held on the holding frame 2. The diaphragm unit 3 is provided with a diaphragm driving portion 3a and a shutter driving portion 3b that are separate from each other.

The diaphragm driving portion 3a is adapted to drive a plurality of diaphragm blades to change the shape of the diaphragm aperture. The shutter driving portion 3b is adapted to drive two pivoting blades to effect the shutter operation from the open state to the fully shut state.

Reference numeral 4 designates a holding frame (the second lens holding frame) that holds the third lens unit. A sleeve portion 4a and a long groove 4b of the holding frame 4 are guided by a guide bar 8 and a guide bar 9 respectively so that the holding frame 4 is movable along the optical axis direction.

Reference numeral 12 designates a CCD holder serving as a base of the lens barrel unit. The CCD holder 12 constitutes, together with a fixed lens barrel 13 secured on the front end portion thereof by screws, the structural frame of the lens barrel unit. As shown in FIG. 2, an image pickup element such as a CCD and a low pass filter 15 are fixedly held on the CCD holder 12.

A cam groove 13a is formed on the inner side of the fixed barrel 13. A follower pin 16a made of a metal fixedly attached on a movable cam ring 16 is fitted in the cam groove 13a. When the movable cam ring 16 is rotated along the cam groove 13a, the movable cam ring is driven to be extended or retracted along the optical axis direction.

In the fixed barrel 13, a motor for zooming 17, a gear 18 joined to the output shaft of the motor 17, a gear train 19 for reducing the output of the gear 18 and an output gear 20 are assembled. Thus, when a rotational force is transmitted from the motor for zooming 17 to gear teeth 16b formed on the outer circumference of the movable cam ring 16, the movable cam ring 16 is rotationally driven and moved along the optical axis direction under control. Three fins 18a used for detecting rotation of the motor for zooming 17 are provided on the gear 18. A photo interrupter 21, 22 is provided at an angle of 150° as seen from the direction of the rotary shaft in such a way that its slit portion is interrupted by the fins 18a.

A linear movement guide barrel 23 is rotatably fitted inside the movable cam ring 16. A projection 23a provided on the linear movement guide barrel 23 is fitted in a groove 13b formed on the fixed barrel 13 so that the linear movement guide barrel 23 will not rotate relative to the fixed barrel 13. Three projections 23b formed on the linear movement guide barrel 23 are fitted in a groove 16c formed on the inner surface of the movable cam ring 16. Thus, the linear movement guide barrel 23 and the movable cam ring 16 move together in the optical axis direction, though they are rotatable relative to each other.

The metal follower pin 1a formed on the holding frame 1 for the first lens unit is fitted in a cam groove 16d of the movable cam ring 16. A boss 1b formed on the holding frame 1 is fitted in a linear movement groove 23c of the linear movement guide 23. Rotation of the holding frame 1 is prevented by the linear movement groove 23c, and when the movable cam 16 rotates, the holding frame 1 is advanced in the optical axis direction.

Similarly, the holding frame 2 for the second lens unit is also regulated by fitting of the follower pin 2a in a cam groove 16e of the movable cam 16 and a linear movement groove 23d of the linear movement guide barrel 23.

Thus, when the movable cam 16 rotates, the holding frame 2 is advanced in the optical axis direction along the cam groove 16e.

The initial zoom position is detected based on light interruption in a photo interrupter 24 fixed on the CCD holder 12 on the fixed barrel 13, caused by a light interruption plate (not shown) provided on the linear movement guide barrel 23.

As described before, three fins 18a used for detecting rotation of the motor for zooming 17 are provided on the gear 18. When the slit portion of the photo interrupter 21, 22 is interrupted by the fins 18a, rotation of the motor for zooming 17 is translated into pulses, and the number of revolutions of the motor for zooming 17 is detected by counting the pulses. The zoom position is determined based on the number of revolutions thus detected and the initial zoom position that has been previously detected.

Figure 7:
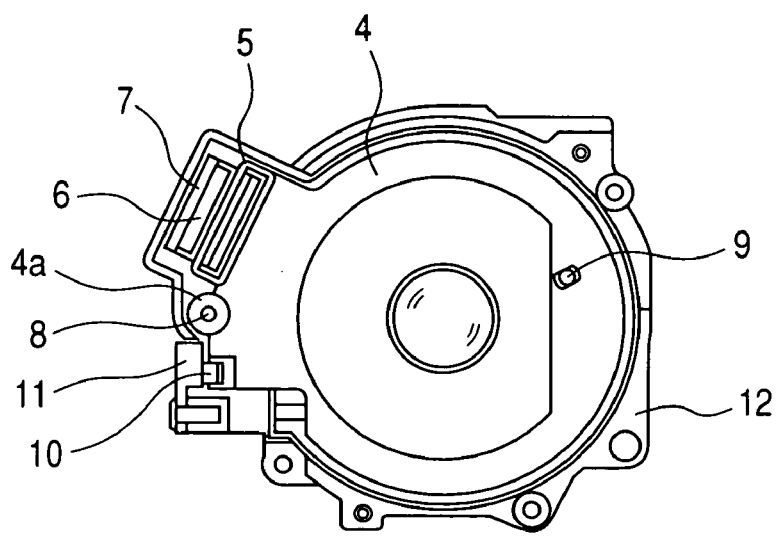
FIG. 7 shows a portion of the arrangement shown in FIG. 1.

As shown in FIG. 7, an air core coil 5 is fixed on the holding frame 4 for the third lens unit at a position in the vicinity of the sleeve portion 4a, and a drive magnet 6 is fixed on the fixed barrel 13. The air core coil 5 is positioned in such a way that its coil axis is parallel to the optical axis, and the drive magnet 6 is positioned in such a way as to extend parallel to the optical axis. When the air core coil 5 is energized, the holding frame 4 is driven along the optical axis direction by the effect of the magnetic circuit formed by a coil yoke 7 and the drive magnet 6. The coil 5 and the magnet 6 constitute the linear driving portion.

In connection with this, this arrangement may be modified in such a way that the magnet 6 is provided on the holding frame 4 and the coil 5 is provided on the fixed barrel 13.

An encoder magnet 10 serving as a magnetic encoder is fixed on the holding frame 4 at a position in the vicinity of the sleeve 4a. The encoder magnet 10 is so magnetized as to have N poles and S poles arranged at a constant pitch, and changes in the magnetization are detected by an MR sensor serving as a magnetic sensor fixed on the fixed barrel 13.

The initial position of the holding frame 4 is determined by the abutment plane (the reference plane) between the holding frame and the CCD holder 12 fixed on the fixed barrel 13.

Detection of the position of the holding frame 4 relative to this reference plane and drive control for the holding frame 4 are effected based on an output signal from the MR sensor 11 which reflects changes in the magnetism (or changes in the intensity of the magnetism) acting on the MR sensor 11 as the encoder magnet 10 moves relative to the MR sensor 11. The MR sensor 11 generates two-phase sinusoidal outputs with a phase difference of 90 degrees, based on which the movement amount and movement direction of the encoder magnet 10 (or the holding frame 4) are determined.

In connection with this, the output of the MR sensor 11 may have three or more phases. The phase angle may be different than 90 degrees.

Furthermore, the above-described noncontact detecting portion (the encoder 10 and the sensor 11) is not limited to magnetic detectors, but optical detectors may also be employed.

In the above arrangement, the air core coil 5, the yoke 7, the drive magnet 6, the encoder magnet 10, the MR sensor 11, the sleeve portion 4a and the guide bar 8 are disposed outside the movable cam ring 16 as seen from the optical axis direction, and therefore no interference occurs when the holding frames are moved along the optical axis direction. In addition, the air core coil 5, the yoke 7, the drive magnet 6, the encoder magnet 10, the MR sensor 11, the sleeve portion 4a and the guide bar 8 are disposed outside the holding frame 1 for the first lens as seen from the optical axis direction.

As shown in FIG. 7, by providing the linear detection portion composed of the encoder magnet 10 and the MR sensor 11 and the linear driving portion composed of the air core coil 5, the yoke 7 and the drive magnet 6 in the vicinity of the sleeve portion 4a of the holding frame 4 and at substantially equal distances from the optical axis, it is possible to transmit driving force without twist and highly accurate position control can be achieved.

As per the above, in this embodiment, a linear driving portion composed of the coil 5 and the magnet 6 is employed as a driving source for moving the holding frame 4 that holds the focusing lens (i.e. the third lens unit), and drive control is effected based on the position of the focusing lens with respect to the optical axis direction detected by the magnetic (may alternatively be optical) encoder 10 and sensor 11. Thus, fine and high speed movement of the focusing lens is made possible.

In addition, by disposing the linear driving portion 5 and 6 and the linear detection portion 10 and 11 outside the movable cam ring 16 used for moving the holding frame 1 for the first lens unit and the holding frame 2 for the second lens unit, interference of those portions and the holding frame 1 for the first lens unit and the holding frame 2 for the second lens unit moved for changing the magnification can be prevented, and the total length of the lens barrel unit in the collapsed state can be reduced.

Figure 4:
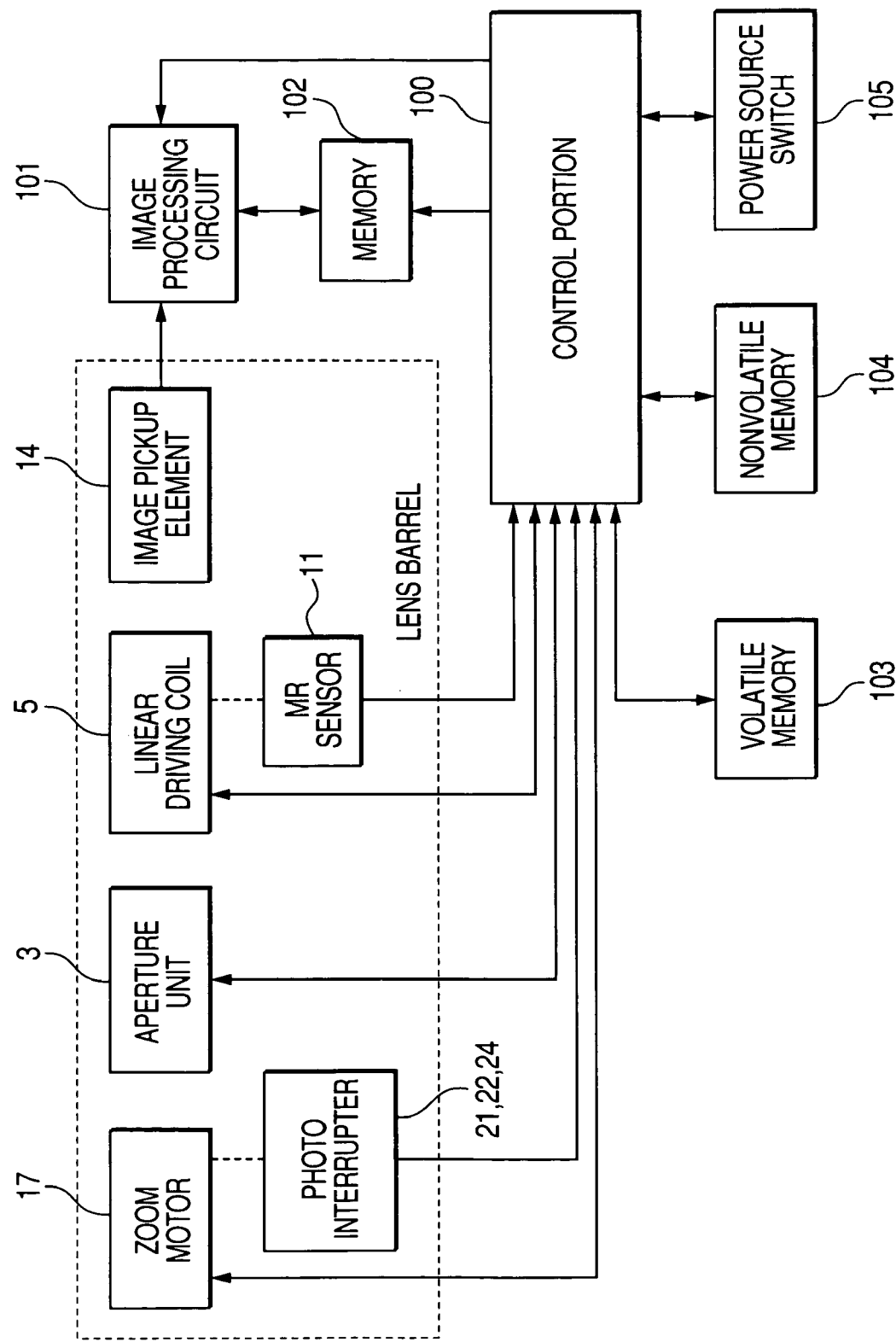
FIG. 4 is a block diagram showing the arrangement of a control system of an optical apparatus according to the present invention.

FIG. 4 is a block diagram schematically showing a control system of a camera (i.e. an optical apparatus) equipped with the above-described lens barrel unit.

An image signal obtained by photoelectric conversion by the image pickup element 14 is subjected to predetermined image processing, such as color conversion and gamma processing, in the image processing circuit 101 and recorded threreafter in a memory 102 in the form of a card type medium etc. A control portion 100 is adapted to perform overall control of the camera. The control portion 100 performs distance measurement control, exposure control and zooming control by driving the drive coil 5 of the linear driving portion, the diaphragm unit 3 and the motor for zooming 7 etc. while monitoring outputs from the photo interrupters 21, 22, 24 for zooming control and the MR sensor 11 for focusing control etc. The control portion 100 also controls the aforementioned signal processing and operations of the memory 102.

Reference numeral 104 designates a nonvolatile memory, such as an EEPROM or the like, in which data can be recorded and deleted electrically. Reference numeral 103 designates a volatile memory in which data can be recorded and deleted electrically. In the volatile memory 103, various parameters etc. used in the camera are stored. Reference numeral 105 designates a power source switch.

Figure 5:
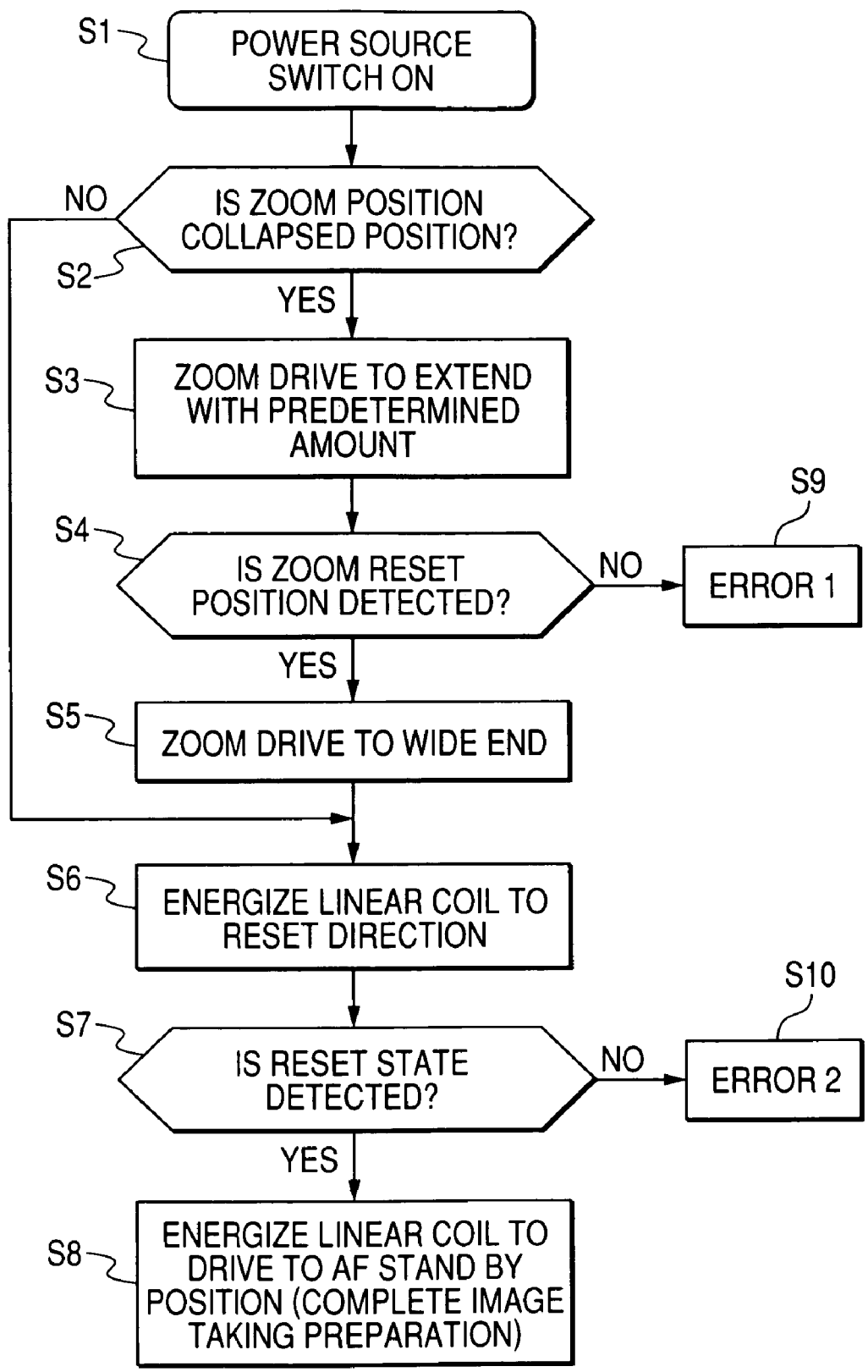
Figure 6:
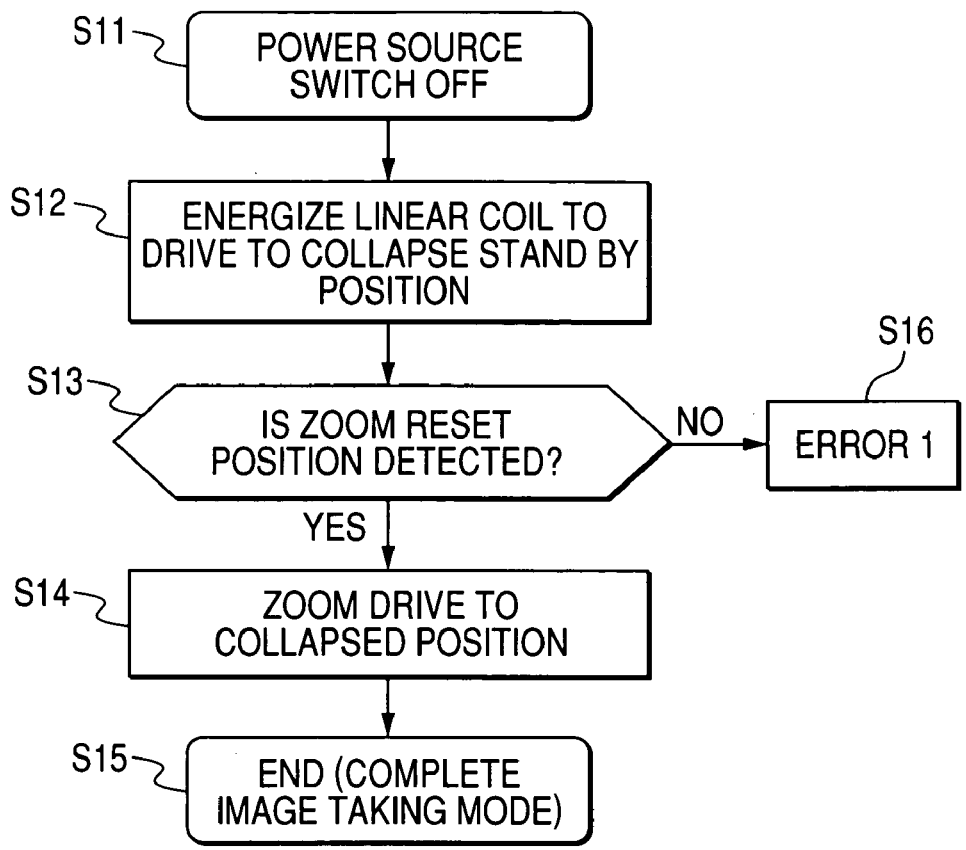
FIG. 6 is a flow chart of a control process when the power of the optical apparatus according to the present invention is turned off.

Next, operations upon turning-on and turning-off the power will be described with reference to FIGS. 5 and 6.

When the power source switch 105 is turned on (step S1), a determination is made as to whether the lens barrel is in the collapsed position or not (step S2).

If it is determined that the lens barrel is in the collapsed position, the motor for zooming 17 is driven to rotate to extend the lens barrel (i.e. the holding frames 1 and 2) by a specified amount (step 3). In this process, the lens barrel is normally driven to the initial zoom position. The initial zoom position is detected by light interruption in the photo interrupter 24 by the light interruption plate provided on the bottom of the linear movement guide barrel 23. Then, a determination is made as to whether a signal of the photo interrupter 24 is detected within a predetermined time period or not (step S4).

If the signal of the photo interrupter 24 is not detected, a first error process, such as turning-off of the power, is executed (step S9).

On the output gear 18 of the motor for zooming 17, the three fins 18a are provided, and rotation of the motor for zooming 17 is translated into pulses by detecting passing of the fins 18a by means of the photo interrupter 21, 22 to detect the number of revolutions and the rotation direction of the motor for zooming 17. The number of revolutions is detected using the aforementioned initial zoom position as the reference, while the numbers of revolutions corresponding to the wide-angle, middle and telephoto zoom positions of the lens barrel have been stored in the nonvolatile memory 104. After the lens barrel has been driven to the initial zoom position, the lens barrel (the holding frames 1 and 2) is moved to the wide-angle end position (the extended position) at which a wide-angle photograph can be taken (step S5).

After the lens barrel has been moved to the wide-angle end position, the holding frame 4 for the third lens unit is driven by energizing the linear drive coil 5 (step S6) to cause the reference surface of the holding frame 4 for the third lens unit to abut the reference surface provided on the CCD holder 12. Thus, the initial focus position is determined based on the output value of the MR sensor 11 at that time (step S7).

In the nonvolatile memory 106, the output value of the MR sensor 11 for the initial position is stored, and if there is something unusual, it is determined that a certain trouble is occurring, and a second error process, such as turning-off the power, is executed (step S10).

On the other hand, if there is no problem in determining the initial focus position, the holding frame 4 for the third lens is driven to a wide angle standby position, which is stored in the nonvolatile memory 104 in advance, based on the output signal of the MR sensor 11, and control such as diaphragm control and white balance control is effected based on the brightness of the object and other information to be in preparation for image pickup operation (step S8).

When the power source switch 105 is turned off by an operator (step S11), the holding frame 4 for the third lens unit is moved by the linear drive coil 5 to the standby position in the collapse side (or the collapsed position) (step S12).

After that, the motor for zooming 17 is driven to rotate to effect collapse operation until the collapse standby position is achieved. In this process, if the movement to the collapse standby position is normally performed, a change in the output signal of the photo interrupter 24 used for zoom reset occurs. In view of this, a determination is made as to whether or not such a change in the signal is detected (step S13).

If the change in the output signal of the photo interrupter 24 is not detected, the first error process is executed (step S16).

On the other hand, if the change in the output signal of the photo interrupter 24 is detected, the lens barrel is driven to the collapsed position (step S14), and then the power is turned off by an electric termination process (step S15).

Although the above description of the embodiment has been directed to a zoom optical system composed of three lens units, the present invention can also be applied to zoom optical systems composed of two lens units or more than three lens units.

As per the above, according to this embodiment, by disposing the linear driving portion 5, 6 and the linear detection portion 10, 11 outside the movable cam ring 16 used for moving the holding frame 1 for the first lens unit and the holding frame for the second lens unit, it is possible to prevent interference without making an opening on the holding frame 1 for the first lens unit and the holding frame 2 for the second lens Unit that are moved relative to the fixed lens barrel from the collapsed position in which the image taking is not allowed to the extended position in which image taking is allowed. Thus, it is possible to reduce the length of the lens barrel in the collapsed state.

Furthermore, by using the linear driving portion 5, 6, it is possible to reduce the length of the driving portion in the optical axis direction relative to the movement amount of the focusing lens unit (the third lens unit).

To summarize, according to the present invention, it is possible to make the total length of the lens in the collapsed state shorter, and so a lens apparatus and an optical apparatus equipped with the same that are advantageous in their portability can be realized.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-140949 filed on May 11, 2004, which is hereby incorporated by reference herein.

What is claimed is:

1. A lens apparatus comprising:
   a fixed lens barrel;
   a cam ring that is rotatable relative to the fixed lens barrel;
   a first lens holding frame adapted to move, upon rotation of the cam ring, relative to the fixed lens barrel along the optical axis direction over the range from a collapsed position to an extended position;
   a second lens holding frame disposed on the image side of the first lens holding frame; and
   a driving portion having a coil and a magnet, disposed outside the cam ring, for driving the second lens holding frame along the optical axis direction;
   wherein the coil is provided on the second lens holding frame in such a way that the coil axis is parallel to the optical axis, and the magnet is provided on the fixed lens barrel in such a way as to extend in a direction parallel to the optical axis.

2. A lens apparatus according to claim 1, further comprising a detection portion for detecting the position of the second lens holding frame with respect to the optical axis direction using an encoder and a sensor of a noncontact type, wherein the second lens holding frame is driven along the optical axis direction based on a result of detection by the detection portion.

3. A lens apparatus according to claim 2, wherein the second lens holding frame has a magnetic encoder and the fixed lens barrel has a magnetic sensor.

4. A lens apparatus according to claim 2, wherein the detection portion is disposed outside the cam ring.

5. A lens apparatus according to claim 2, further comprising a guide bar for guiding the second lens holding frame along the optical axis direction, wherein the linear driving portion and the detection portion are disposed in the vicinity of the guide bar.

6. A lens apparatus according to claim 1, further comprising a third lens holding frame provided between the first lens holding frame and the second lens holding frame, wherein magnification change is effected by means of a first lens unit having a negative refractive power held by the first lens holding frame and a second lens unit having a positive refractive power held by the third lens holding frame, and focusing is effected by means of a third lens unit having a positive refractive power held by the second lens holding frame.

7. An optical apparatus comprising a lens apparatus according to claim 1 and an image pickup element.

8. A lens apparatus having an image plane comprising:
   a fixed lens barrel;
   a cam ring that is rotatable around an optical axis while moving in an optical axis direction, relative to the fixed lens, said cam ring moving from a collapsed position to an extended position;
   a plurality of lens holding frames adapted to move, upon rotation and movement of the cam ring, relative to the fixed lens barrel, in the optical axis direction over the range from a collapsed position to an extended position;
   a focusing lens holding frame disposed on the image plane side of the plurality of lens holding frames; and
   a linear motor for driving the focusing lens holding frame in the optical axis, said linear motor being disposed outside the cam ring in case of the cam ring being at the collapsed position.

9. An optical apparatus comprising a lens apparatus according to claim 8 and an image pickup element.

* * * * *